United States Patent
Li (10) Patent No.: US 12,255,961 B2
(45) Date of Patent: Mar. 18, 2025

(54) DATA INTERACTION METHOD AND APPARATUS UNDER DIFFERENT STORAGE PROTOCOLS, AND DEVICE AND MEDIUM

(71) Applicant: INSPUR (BEIJING) ELECTRONIC INFORMATION INDUSTRY CO., LTD., Beijing (CN)

(72) Inventor: Meixin Li, Beijing (CN)

(73) Assignee: INSPUR (BEIJING) ELECTRONIC INFORMATION INDUSTRY CO., LTD., Beijing (CN)

( * ) Notice: Subject to any disclaimer, the term of this patent is extended or adjusted under 35 U.S.C. 154(b) by 0 days.

(21) Appl. No.: 18/270,212

(22) PCT Filed: Apr. 29, 2022

(86) PCT No.: PCT/CN2022/090144
§ 371 (c)(1),
(2) Date: Jun. 29, 2023

(87) PCT Pub. No.: WO2022/252898
PCT Pub. Date: Dec. 8, 2022

(65) Prior Publication Data
US 2024/0106901 A1 Mar. 28, 2024

(30) Foreign Application Priority Data
May 31, 2021 (CN) .......................... 202110598734.4

(51) Int. Cl.
*H04L 12/24* (2006.01)
*H04L 41/0803* (2022.01)
(Continued)

(52) U.S. Cl.
CPC ........ *H04L 67/141* (2013.01); *H04L 67/1097* (2013.01); *H04L 69/18* (2013.01)

(58) Field of Classification Search
CPC ... H04L 67/141; H04L 67/1097; H04L 69/18; H04L 69/22; H04L 69/26; Y02D 10/00
(Continued)

(56) References Cited

U.S. PATENT DOCUMENTS 10,678,433 B1 6/2020 Kirkpatrick
2014/0195634 A1* 7/2014 Kishore .............. H04L 67/1097
709/213

(Continued)

FOREIGN PATENT DOCUMENTS

CA 2632509 A1 11/2009
CN 106688217 A 5/2017
(Continued)

OTHER PUBLICATIONS

Ziqiu Bai. "Design and Implementation of Software Definition Storage Based on NVMeOF." A dissertation for master''s degree. CEIC, Apr. 11, 2019.

*Primary Examiner* — Moustafa M Meky
*Assistant Examiner* — Elizabeth Kassa
(74) *Attorney, Agent, or Firm* — IPro, PLLC (57) ABSTRACT

Disclosed in the present disclosure are a data interaction method and apparatus under different storage protocols, and a device and a medium. The method includes: acquiring a storage protocol switching instruction, and upgrading a storage device on the basis of the storage protocol switching instruction, so as to obtain the upgraded storage device, which may perform data interaction with a server on the basis of an NVME protocol; releasing a volume mapping relationship, which is constructed between the server and a preset block data space of the upgraded storage device on the basis of an SCSI protocol, and establishing a connection relationship between the server and the upgraded storage device on the basis of the NVME protocol; and remapping the preset block data space to the server in the form of a
(Continued)

namespace, such that the server performs data interaction with upgraded storage device based on the NVME protocol.

18 Claims, 3 Drawing Sheets

(51) Int. Cl.
  *H04L 67/1097* (2022.01)
  *H04L 67/141* (2022.01)
  *H04L 69/18* (2022.01)
(58) Field of Classification Search
  USPC .......................................................... 709/219
  See application file for complete search history.

(56) References Cited

U.S. PATENT DOCUMENTS

| | | | |
|---|---|---|---|
| 2018/0321879 A1* | 11/2018 | Lu | G06F 3/06 |
| 2018/0329827 A1* | 11/2018 | Chien | G06F 12/0246 |
| 2020/0218452 A1 | 7/2020 | Niven et al. | |
| 2020/0225863 A1 | 7/2020 | Veluswamy et al. | |
| 2020/0293465 A1 | 9/2020 | Yang et al. | |
| 2021/0034275 A1 | 2/2021 | Venkatanarayanan et al. | |
| 2021/0160318 A1 | 5/2021 | Sajeepa et al. | |
| 2021/0365206 A1* | 11/2021 | Liu | G06F 3/0644 |
| 2021/0405921 A1* | 12/2021 | Venkatanarayanan | G06F 3/0635 |
| 2022/0231905 A1* | 7/2022 | Dhatchinamoorthy | H04L 41/0668 |
| 2022/0382914 A1* | 12/2022 | Anchi | H04L 9/083 |

FOREIGN PATENT DOCUMENTS

| | | |
|---|---|---|
| CN | 107783917 A | 3/2018 |
| CN | 110275757 A | 9/2019 |
| CN | 113472744 A | 10/2021 |
| WO | 2016196766 A2 | 12/2016 |

\* cited by examiner

DATA INTERACTION METHOD AND APPARATUS UNDER DIFFERENT STORAGE PROTOCOLS, AND DEVICE AND MEDIUM

CROSS-REFERENCE TO RELATED APPLICATION

This application claims the priority of the Chinese Patent application filed on May 31, 2021 before the China National Intellectual Property Administration with the application number of 202110598734.4, and the title of "DATA INTERACTION METHOD AND APPARATUS UNDER DIFFERENT STORAGE PROTOCOLS, AND DEVICE AND MEDIUM", which is incorporated herein in its entirety by reference.

FIELD

The present disclosure relates to the field of computer technologies and, more particularly, to a method for data interaction under different storage protocols, an apparatus, a device and a medium.

BACKGROUND

A common application scenario for a storage device is a fibre channel storage area network (FC SAN), that is, the storage device is connected to a fibre channel (FC) network through an FC link, and a server is also connected to the FC network through the FC link. The storage device provides a block storage space for the server. In a conventional FC SAN application, the server interacts with the storage device in accordance with the small computer system interface (SCSI) protocol, and the FC links carry the SCSI protocol.

With the development of storage technology in recent years, an industrial standard of the non-volatile memory express (NVMe) over FC technology has been launched, which enables the server to interact with the storage device in accordance with the NVMe protocol rather than the SCSI protocol. In a newly established data center, the server may be connected to the storage device by directly using the NVMe over FC technology. But for an existing storage device, in a case that the existing storage device interacts with the server by using the SCSI protocol and the server switches to the NVMe over FC technology, the storage device also needs to switch to the NVMe over FC technology, so as to interact with the server. However, when performing interaction by using the SCSI protocol, the server writes data into the storage device through the SCSI protocol, and when switching to the NVMe protocol for interaction, the server needs to copy the data from the storage device through the SCSI protocol and writes the data into a new storage space by the NVMe over FC, which may cost a lot of time. Furthermore, if the original storage device is no longer used, it may also cause a waste of assets.

SUMMARY

In view of this, an objective of the present disclosure is to provide a method for data interaction under different storage protocols, an apparatus, a device and a storage medium, which may smoothly migrate SCSI storage to NVMe storage to improve the utilization rate of storage resources, of which the solutions may be described below.

In a first aspect, the present disclosure provides a method for data interaction under different storage protocols, including:

acquiring a storage protocol switching instruction, and upgrading a storage device based on the storage protocol switching instruction to obtain the upgraded storage device capable of performing the data interaction with a server based on a non-volatile memory express (NVMe) protocol;

releasing a volume mapping relationship constructed between the server and a preset block data space of the upgraded storage device based on a small computer system interface (SCSI) protocol, and establishing a connection relationship between the server and the upgraded storage device based on the NVMe protocol; and remapping the preset block data space to the server in a form of a namespace, so that the server performs the data interaction with the upgraded storage device based on the NVMe protocol.

In an embodiment, establishing the connection relationship between the server and the upgraded storage device based on the NVMe protocol includes:

establishing the connection relationship between the server and the upgraded storage device by using a fibre card for performing data transmission based on the NVMe protocol.

In an embodiment, remapping the preset block data space to the server in the form of the namespace includes:

acquiring a universally unique identifier of the server; and determining whether the server is matched with the preset block data space according to the universally unique identifier, and in a case that the server is matched with the preset block data space, remapping the preset block data space to the server in the form of the namespace.

In an embodiment, the server performing the data interaction with the upgraded storage device based on the NVMe protocol includes:

filtering out a data request transmitted by the server based on the NVMe protocol by using the fibre card; and parsing the data request based on an NVMe protocol parsing function of the upgraded storage device, so that the data interaction is performed according to the parsed data request.

In an embodiment, before releasing the volume mapping relationship constructed between the server and the preset block data space of the upgraded storage device based on the SCSI protocol, the method further includes:

controlling the server to stop a read operation for a data volume in the preset block data space.

In an embodiment, the method for the data interaction under different storage protocols further includes: storing the volume mapping relationship and a mapping relationship obtained after remapping in the storage device.

In an embodiment, the method for the data interaction under different storage protocols further includes: the method further includes: recording information of the preset block data space.

In a second aspect, the present disclosure provides an apparatus for data interaction under different storage protocols, including:

an acquisition module, configured to acquire a storage protocol switching instruction, and upgrade a storage device based on the storage protocol switching instruction to obtain the upgraded storage device capable of performing the data interaction with a server based on an NVMe protocol;

a connection module, configured to release a volume mapping relationship constructed between the server and a preset block data space of the upgraded storage device based on an SCSI protocol, and establish a connection relationship between the server and the upgraded storage device based on the NVMe protocol; and a mapping module, configured to remap the preset block data space to the server in a form of a namespace, so that the server performs the data interaction with the upgraded storage device based on the NVMe protocol.

In a third aspect, the present disclosure provides an electronic device, including a processor and a memory, wherein the memory is configured to store a computer program that, when loaded and executed by the processor, implements the method for the data interaction under different storage protocols stated above.

In a fourth aspect, the present disclosure provides a computer-readable storage medium, configured to storing a computer-executable instruction that, when loaded and executed by a processor, implements the method for the data interaction under different storage protocols stated above.

In the present disclosure, first, a storage protocol switching instruction is acquired, and a storage device is upgraded based on the storage protocol switching instruction to obtain the upgraded storage device capable of performing the data interaction with a server based on the NVMe protocol; then, a volume mapping relationship constructed between the server and a preset block data space of the upgraded storage device based on the SCSI protocol is released, and a connection relationship is established between the server and the upgraded storage device based on the NVMe protocol; and finally, the preset block data space is remapped to the server in a form of a namespace, so that the server performs data interaction with the upgraded storage device based on the NVMe protocol. In the present disclosure, the storage device is upgraded based on the acquired storage protocol switching instruction, and based on this, the volume mapping relationship constructed between the server and the preset block data space of the storage device based on the SCSI protocol is released, the connection relationship is established between the server and the storage device based on the NVMe protocol, and the preset block data space is remapped to the server in the form of the namespace. According to the foregoing steps, the SCSI storage may be smoothly migrated to the NVMe storage to improve the utilization rate of storage resources.

BRIEF DESCRIPTION OF THE DRAWINGS

In order to explain the embodiments of the present disclosure or the technical solutions in the prior art more clearly, a brief description may be given below with reference to the accompanying drawings which are used in the description of the embodiments or the prior art, and it is obvious that the drawings in the description below are merely some embodiments of the present disclosure, and a person skilled in the art may obtain other drawings according to the provided drawings without involving any inventive effort.

DETAILED DESCRIPTION

In the following, the technical solution of the embodiment of the present disclosure may be clearly and completely described in combination with the drawings of the embodiment of the present disclosure. Obviously, the embodiment described is only a part of the embodiments of the present disclosure, not the whole embodiments. Based on the embodiments in the present disclosure, all other embodiments obtained by a person of ordinary skill in the art without making creative labor belong to the scope of protection of the present disclosure.

In the prior art, when performing interaction based on the SCSI protocol, a server writes data into a storage device based on the SCSI protocol, and when switching to the NVMe protocol for interaction, the server needs to copy the data from the storage device through the SCSI protocol and write the data into a new storage space by the NVMe over FC, which will cost a lot of time. Furthermore, if the original storage device is no longer used, it may also cause a waste of assets. In view of the foregoing technical defects, the embodiments of the present disclosure provide a solution for data interaction under different storage protocols. According to the solution for performing data interaction under different storage protocols, a storage device is upgraded based on an acquired storage protocol switching instruction, based on this, a volume mapping relationship constructed between a server and a preset block data space of the storage device based on the SCSI protocol is released, and a connection relationship is established between the server and the storage device based on the NVMe protocol, and the preset block data space is remapped to the server in the form of the namespace. According to the foregoing steps, SCSI storage may be smoothly migrated to NVMe storage to improve the utilization rate of storage resources.

Figure 1:
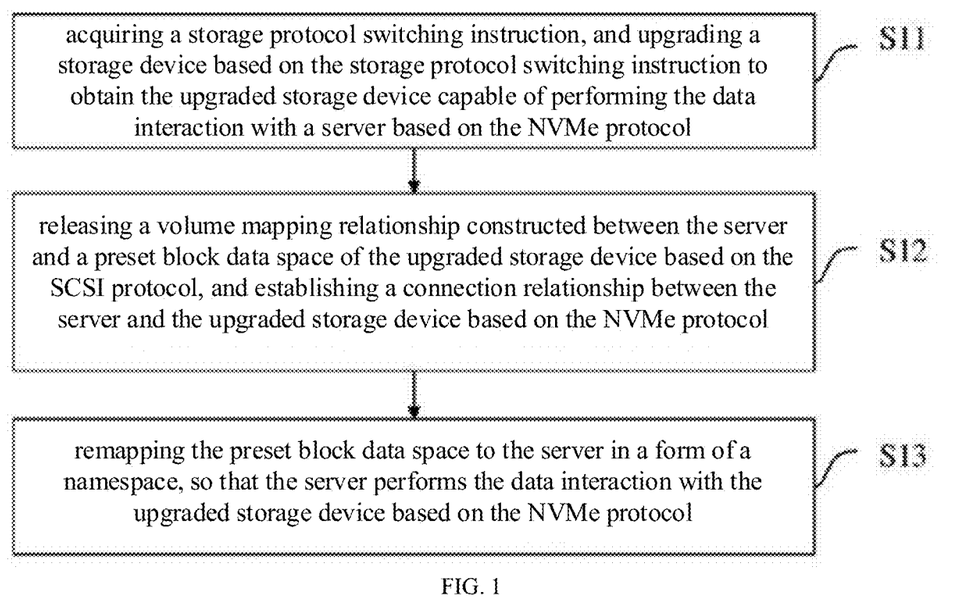
FIG. 1 is a flowchart of a method for data interaction under different storage protocols according to the present disclosure.

FIG. 1 is a flowchart of a method for data interaction under different storage protocols according to an embodiment of the present disclosure. Referring to FIG. 1, the method for the data interaction under different storage protocols includes:

S11: acquiring a storage protocol switching instruction, and upgrading a storage device based on the storage protocol switching instruction to obtain the upgraded storage device capable of performing the data interaction with a server based on the NVMe protocol.

Figure 2:
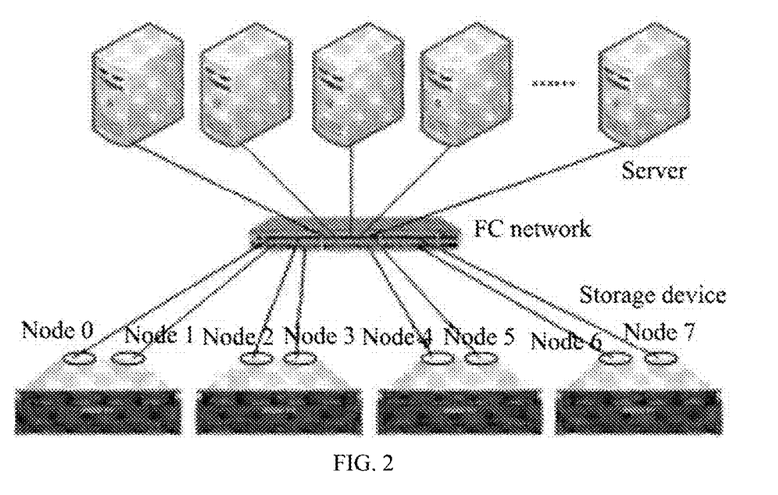
FIG. 2 is a schematic diagram of a fibre channel storage area network (FC SAN) application scenario according to the present disclosure.

In the present embodiment, first, a storage protocol switching instruction is acquired, and then, a storage device is upgraded based on the storage protocol switching instruction to obtain the upgraded storage device capable of performing data interaction with the server based on the NVMe protocol. The storage protocol switching instruction is a trigger instruction for characterizing the switch from the interaction between the server and the storage device by using the SCSI protocol to the interaction between the server and the storage device by using the NVMe protocol. The server may interact with the storage device by using the SCSI protocol according to an architecture shown in FIG. 2. At this moment, the storage device presents a block data space to the server in a form of a volume, and the server reads data from or writes data into the volume, and performs interaction in accordance with the SCSI protocol.

Figure 3:
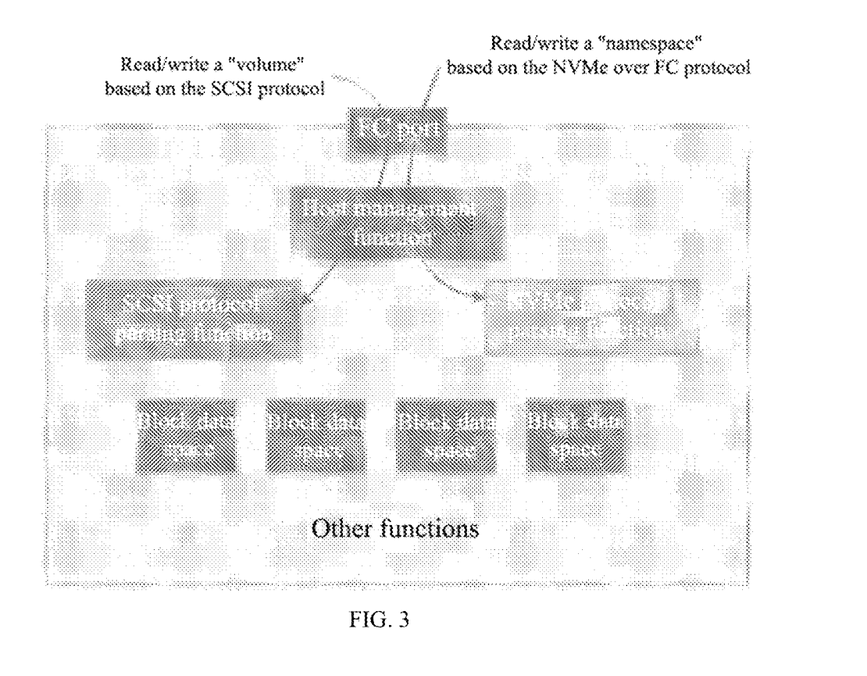
FIG. 3 is a schematic diagram of function modules of the upgraded storage device according to the present disclosure.

When the server and the storage device switch to use the NVMe protocol for interaction, it is necessary to upgrade the storage device, and an upgrade storage device is capable of performing data interaction with the server based on the NVMe protocol. The upgraded storage device has a host management function, a block data space management function, a protocol parsing function, and the like, as shown in FIG. 3. The host management function is to recognize the server according to information of an FC port connected to the server and a universally unique identifier (UUID) of the server, select a block data space according to requirements of business, map the block data space to the server, and record a mapping relationship in a host management function module. The block data space management function records an address, a size, and other relevant information of the block data space, which ensures that user data may be safely stored in the block data space. An object of the protocol parsing function is to interact with the server, and the protocol parsing function may accurately understand and parse a request transmitted by the server, and store the user data in an accurate block data space. In addition, the block data space is parsed and separated from protocol which mainly includes the protocol parsing function and the block data space management function that are uncoupled. The protocol parsing function is to accurately understand a request of the server, and make a response based on an agreed protocol. For the user data, which may be accurately stored in a corresponding block data space according to the information in the host management function.

S12: releasing a volume mapping relationship constructed between the server and a preset block data space of the upgraded storage device based on the SCSI protocol, and establishing a connection relationship between the server and the upgraded storage device based on the NVMe protocol.

In the present embodiment, when the interaction by using the SCSI protocol is switched to the interaction by using the NVMe protocol, that is, when the SCSI storage is smoothly migrated to the NVMe storage, first, a volume mapping relationship constructed between the server and the preset block data space of the upgraded storage device based on the SCSI protocol needs to be released, and then, a connection relationship is established between the server and the upgraded storage device based on the NVMe protocol. The connection relationship may be established between the server and the upgraded storage device by using a fibre card for performing data transmission based on the NVMe protocol. The fibre card is an FC card supporting the NVMe over FC, and the FC card needs to be replaced in a case that the FC card does not support the NVMe over FC. The FC card supporting NVMe over FC is capable of distinguishing protocol types and delivering to a corresponding protocol parsing function module.

It is not difficult to understand that before the volume mapping relationship constructed between the server and the preset block data space of the upgraded storage device based on the SCSI protocol is released, the server needs to be further controlled to stop a read operation for a data volume in the preset block data space. After the storage device is upgraded, volume read/write of the server by the SCSI protocol is stopped. The host management function is operated on the storage device to release the mapping relationship of originally mapping to the block data space of the server in the form of the volume. Only the volume mapping relationship is released, the user data in the block data space remains unchanged. Then, a connection is established between the server and the upgraded storage device through the NVMe protocol.

S13: remapping the preset block data space to the server in a form of a namespace, so that the server performs the data interaction with the upgraded storage device based on the NVMe protocol.

In the present embodiment, the preset block data space is remapped to the server in the form of the namespace, so that the server performs the data interaction with the upgraded storage device based on the NVMe protocol. The host management function module is configured to control whether a connection to the server is allowed, and record information about the connection to server. The process of remapping the preset block data space to the server in the form of the namespace includes: first, the UUID of the server is acquired, then, whether the server is matched with the preset block data space is determined according to the UUID, and when the server is matched with the preset block data space, the preset block data space is remapped to the server in the form of the namespace. That is, the block data space originally mapped to the specific server is remapped to the server in the form of the namespace, and information is recorded in the host management function module.

In an embodiment, the server performs the data interaction with the upgraded storage device based on the NVMe protocol. The server interacts with the upgraded storage device based on the NVMe protocol and reads the user data from or writes the user data into the storage device. Based on the foregoing steps, in the present embodiment, a data request transmitted by the server based on the NVMe protocol may be filtered out by using the fibre card, and then the data request is parsed based on the NVMe protocol parsing function of the upgraded storage device, so that data interaction is performed according to the parsed data request. An NVMe protocol parsing function module processes the request of the server. In an FC SAN application scenario, when the interaction between the server and the storage device is upgraded from the SCSI protocol to the NVMe protocol, the user data may be smoothly migrated to avoid particularly time-consuming large-scale data copying and writing processes, and the continued use of user storage device assets may be protected to implement the method for smoothly migrating the SCSI storage to the NVMe storage.

In addition, in order to improve the fault-tolerant rate and configuration recovery capability of a system, in the embodiments of the present disclosure, the volume mapping relationship and a mapping relationship obtained after remapping may be further stored in the storage device, and at the same time, information of the preset block data space is recorded. The mapping information may be recorded in the host management function module, and the host management function module is configured to manage the connection information of the server, accurately recognize the server, and may manage the direct mapping relationship between the block data space and the server.

In the present embodiment, the host management function module of the upgraded storage device ensures the accuracy of the mapping relationship, and the protocol parsing module ensures to accurately understand the request of the server, write to-be-stored parsed user data into the block data space, make a response to the server according to the NVMe protocol when the server reads the user data, and accurately transmit the data to the server. In this way, the SCSI storage may be smoothly migrated to the NVMe storage to solve the problem of large time consumption of data copying, and the original storage device assets may also be used to save the cost for a user.

It may be seen that in the embodiments of the present disclosure, first, a storage protocol switching instruction is acquired, and a storage device is upgraded based on the storage protocol switching instruction to obtain the upgraded storage device capable of performing the data interaction with a server based on the NVMe protocol; then, a volume mapping relationship constructed between the server and a preset block data space of the upgraded storage device based on the SCSI protocol is released, and a connection relationship is established between the server and the upgraded storage device based on the NVMe protocol; and finally, the preset block data space is remapped to the server in a form of a namespace, so that the server performs the data interaction with the upgraded storage device based on the NVMe protocol. In the embodiments of the present disclosure, the storage device is upgraded based on the acquired storage protocol switching instruction, based on this, the volume mapping relationship constructed between the server and the preset block data space of the storage device based on the SCSI protocol is released, the connection relationship is established between the server and the storage device based on the NVMe protocol, and the preset block data space is remapped to the server in the form of the namespace. According to the foregoing steps, the SCSI storage may be smoothly migrated to the NVMe storage to improve the utilization rate of storage resources.

Figure 4:
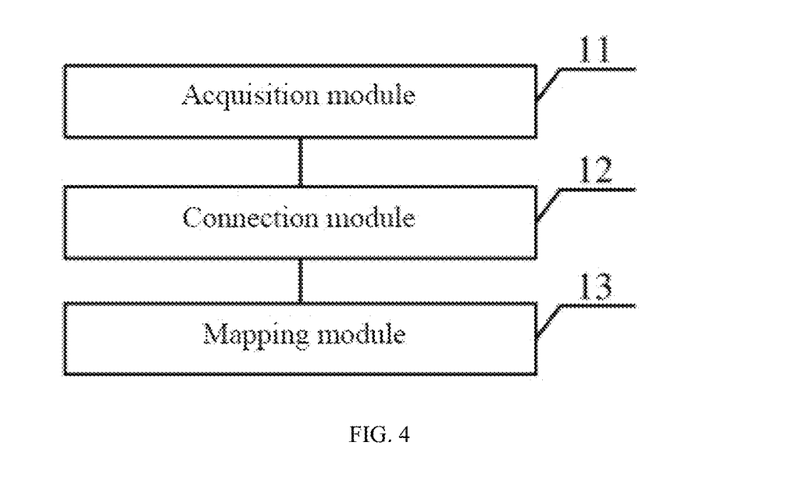
FIG. 4 is a schematic structural diagram of an apparatus for data interaction under different storage protocols according to the present disclosure.

Referring to FIG. 4, the embodiments of the present disclosure further correspondingly disclose an apparatus for data interaction under different storage protocols, which includes:

an acquisition module 11, configured to acquire a storage protocol switching instruction, and upgrade a storage device based on the storage protocol switching instruction to obtain the upgraded storage device capable of performing data interaction with a server based on a NVMe protocol;

a connection module 12, configured to release a volume mapping relationship constructed between the server and a preset block data space of the upgraded storage device based on a SCSI protocol, and establish a connection relationship between the server and the upgraded storage device based on the NVMe protocol; and a mapping module 13, configured to remap the preset block data space to the server in a form of a namespace, so that the server performs the data interaction with the upgraded storage device based on the NVMe protocol.

It may be seen that in the embodiments of the present disclosure, first, a storage protocol switching instruction is acquired, and a storage device is upgraded based on the storage protocol switching instruction to obtain the upgraded storage device capable of performing the data interaction with a server based on the NVMe protocol; then, a volume mapping relationship constructed between the server and a preset block data space of the upgraded storage device based on the SCSI protocol is released, and a connection relationship is established between the server and the upgraded storage device based on the NVMe protocol; and finally, the preset block data space is remapped to the server in the form of the namespace, so that the server performs data interaction with the upgraded storage device based on the NVMe protocol. In the embodiments of the present disclosure, the storage device is upgraded based on the acquired storage protocol switching instruction, based on this, the volume mapping relationship constructed between the server and the preset block data space of the storage device based on the SCSI protocol is released, the connection relationship is established between the server and the storage device based on the NVMe protocol, and the preset block data space is remapped to the server in the form of the namespace. According to the foregoing steps, the SCSI storage may be smoothly migrated to the NVMe storage to improve the utilization rate of storage resources.

In some embodiments, the connection module 12 is configured to establish the connection relationship between the server and the upgraded storage device by using a fibre card for performing data transmission based on the NVMe protocol.

In some embodiments, the mapping module 13 includes:
a matching unit configured to acquire an UUID of the server and determine whether the server is matched with the preset block data space according to the UUID, and in a case that the server is matched with the preset block data space, remap the preset block data space to the server in the form of the namespace; and
an interaction unit configured to filter out a data request transmitted by the server based on the NVMe protocol by using the fibre card, and parse the data request based on an NVMe protocol parsing function of the upgraded storage device, so that the data interaction is performed according to the parsed data request.

In some embodiments, the apparatus for the data interaction under different storage protocols further includes:
a storage module, configured to store the volume mapping relationship and a mapping relationship obtained after remapping in the storage device, and record information of the preset block data space.

Figure 5:
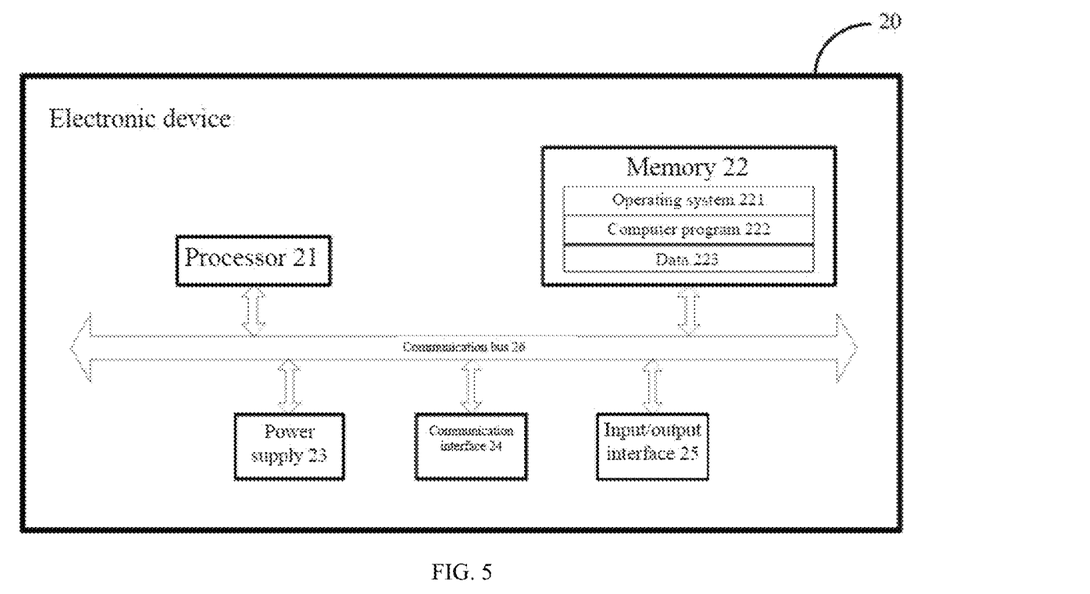
FIG. 5 is a structural diagram of an electronic device for data interaction under different storage protocols according to the present disclosure.

The embodiments of the present disclosure further provide an electronic device. FIG. 5 is a structural diagram of an electronic device 20 according to an exemplary embodiment, and the content in the figure shall not be regarded as any limitation to the range of application of the present disclosure.

FIG. 5 is a schematic structural diagram of an electronic device 20 according to an embodiment of the present disclosure. The electronic device 20 may include: at least one processor 21, at least one memory 22, a power supply 23, a communication interface 24, an input/output interface 25, and a communication bus 26. The memory 22 is configured to store a computer program that, when loaded and executed by the processor 21, implements the relevant steps in the method for data interaction under different storage protocols disclosed in any one of the foregoing embodiments.

In the present embodiment, the power supply 23 is configured to provide working voltage for hardware devices on the electronic device 20, the communication interface 24 is capable of creating a data transmission channel between the electronic device 20 and a peripheral device in accordance with any communication protocol to which the technical solutions of the present disclosure are applicable, which is not defined herein, the input/output interface 25 is configured to acquire data inputted from the outside world or output data to the outside world, and a specific interface type of the input/output interface may be selected according to specific application requirements, which is not defined herein.

In addition, the memory 22, as a carrier for storing resources, may be a read-only memory, a random access memory, a magnetic disk, an optical disk, or the like, resources stored in the memory may include an operating system 221, a computer program 222, data 223, and the like, and a storage mode may be a transitory storage mode or a non-transitory storage mode.

The operating system 221 is used for managing and controlling the hardware devices on the electronic device 20 and the computer program 222 to realize computing and processing of massive data 223 in the memory 22 by the processor 21, which may be Windows Server, Netware, Unix, Linux, or the like. In addition to a computer program used for performing the method for data interaction under different storage protocols that is disclosed in any one of the foregoing embodiments and executed by the electronic device 20, the computer program 222 may further include computer programs used for performing other specific tasks. The data 223 may include a mapping relationship acquired by the electronic device 20.

Figure 6:
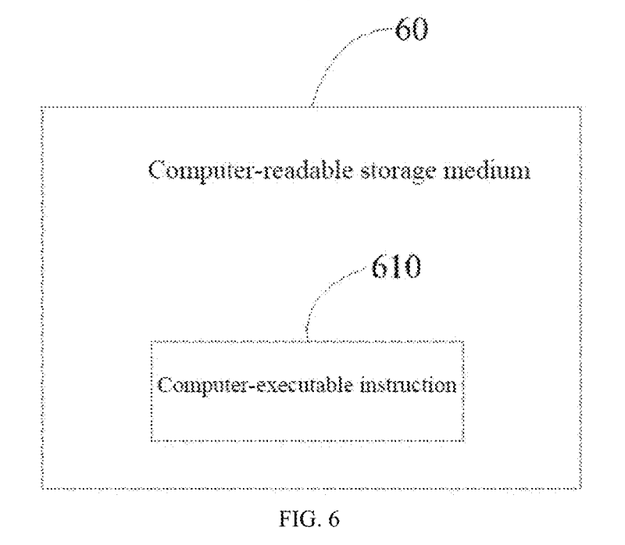
FIG. 6 is a structural diagram of a computer-readable storage medium according to the present disclosure.

FIG. 6 is a structural diagram of a computer-readable storage medium according to the present disclosure. Referring to FIG. 6, in an embodiment, the embodiments of the present disclosure further disclose a computer-readable storage medium 60, which stores a computer-executable instruction 610 that, when loaded and executed by a processor, implements the steps of the method for the data interaction under different storage protocols disclosed in any one of the foregoing embodiments.

Each embodiment in the specification is described in a progressive way. Each embodiment focuses on the differences from other embodiments. The same and similar parts between embodiments may be seen in each other. For the device disclosed in the embodiment, because it corresponds to the method disclosed in the present embodiment, the description is relatively simple, and the relevant places may be seen in the method section.

Finally, it should also be noted that relational terms herein such as first and second, etc., are used merely to distinguish one entity or operation from another entity or operation, and do not necessarily require or imply there is any such relationship or order between these entities or operations. Furthermore, the terms "including", "including" or any variations thereof are intended to embrace a non-exclusive inclusion, such that a process, method, article, or terminal device including a plurality of elements includes not only those elements but also includes other elements not expressly listed, or also incudes elements inherent to such a process, method, article, or device. In the absence of further limitation, an element defined by the phrase "including a . . . " does not exclude the presence of additional identical element in the process, method, article, or device.

A method for data interaction under different storage protocols, an apparatus, a device and a storage medium above provided by the present disclosure are introduced in detail. In this paper, examples are used to explain the principle and implementation of the present disclosure. The above embodiment is only used to help understand the method of the present disclosure and its core ideas. At the same time, for the general technical personnel in the art, according to the idea of the present, there may be changes in the implementation and scope of application. In a word, the content of the specification should not be understood as a limitation of the present disclosure.

The invention claimed is:

1. A method for data interaction under different storage protocols, comprising:
   acquiring a storage protocol switching instruction, and upgrading a storage device based on the storage protocol switching instruction to obtain the upgraded storage device capable of performing the data interaction with a server based on a non-volatile memory express (NVMe) protocol;
   releasing a volume mapping relationship constructed between the server and a preset block data space of the upgraded storage device based on a small computer system interface (SCSI) protocol, and establishing a connection relationship between the server and the upgraded storage device based on the NVMe protocol; and
   remapping the preset block data space to the server in a form of a namespace, so that the server performs the data interaction with the upgraded storage device based on the NVMe protocol;
   wherein establishing the connection relationship between the server and the upgraded storage device based on the NVMe protocol comprises:
   establishing the connection relationship between the server and the upgraded storage device by using a fibre card for performing data transmission based on the NVMe protocol;
   remapping the preset block data space to the server in the form of the namespace comprises:
   acquiring a universally unique identifier of the server; and
   determining whether the server is matched with the preset block data space according to the universally unique identifier, and in a case that the server is matched with the preset block data space, remapping the preset block data space to the server in the form of the namespace.

2. The method for the data interaction under different storage protocols according to claim 1, wherein the server performing the data interaction with the upgraded storage device based on the NVMe protocol comprises:
   filtering out a data request transmitted by the server based on the NVMe protocol by using the fibre card; and
   parsing the data request based on an NVMe protocol parsing function of the upgraded storage device, so that the data interaction is performed according to the parsed data request.

3. The method for the data interaction under different storage protocols according to claim 1, wherein before releasing the volume mapping relationship constructed between the server and the preset block data space of the upgraded storage device based on the SCSI protocol, the method further comprises:
   controlling the server to stop a read operation for a data volume in the preset block data space.

4. The method for the data interaction under different storage protocols according to claim 1, wherein the method further comprises: storing the volume mapping relationship and a mapping relationship obtained after remapping in the storage device.

5. The method for the data interaction under different storage protocols according to claim 1, wherein the method further comprises: recording information of the preset block data space.

6. An electronic device, comprising a processor and a memory, wherein the memory is configured to store a computer program that, when loaded and executed by the processor, implements the method for the data interaction under different storage protocols according to claim 1.

7. The electronic device according to claim 6, wherein establishing the connection relationship between the server and the upgraded storage device based on the NVMe protocol comprises:

establishing the connection relationship between the server and the upgraded storage device by using a fibre card for performing data transmission based on the NVMe protocol.

8. The electronic device according to claim 7, wherein the server performing the data interaction with the upgraded storage device based on the NVMe protocol comprises:
filtering out a data request transmitted by the server based on the NVMe protocol by using the fibre card; and
parsing the data request based on an NVMe protocol parsing function of the upgraded storage device, so that the data interaction is performed according to the parsed data request.

9. The electronic device according to claim 6, wherein remapping the preset block data space to the server in the form of the namespace comprises:
acquiring a universally unique identifier of the server; and
determining whether the server is matched with the preset block data space according to the universally unique identifier, and in a case that the server is matched with the preset block data space, remapping the preset block data space to the server in the form of the namespace.

10. The electronic device according to claim 6, wherein before releasing the volume mapping relationship constructed between the server and the preset block data space of the upgraded storage device based on the SCSI protocol, the method further comprises:
controlling the server to stop a read operation for a data volume in the preset block data space.

11. The electronic device according to claim 6, wherein the method further comprises: storing the volume mapping relationship and a mapping relationship obtained after remapping in the storage device.

12. The electronic device according to claim 6, wherein the method further comprises: recording information of the preset block data space.

13. The electronic device according to claim 6, wherein the storage protocol switching instruction is a trigger instruction for characterizing a switch from an interaction between the server and the storage device by using the SCSI protocol to the interaction between the server and the storage device by using the NVMe protocol.

14. The electronic device according to claim 6, wherein the upgraded storage device has a host management function, a block data space management function and a protocol parsing function.

15. A computer-readable storage medium, configured to storing a computer-executable instruction that, when loaded and executed by a processor, implements the method for the data interaction under different storage protocols according to claim 1.

16. The method for the data interaction under different storage protocols according to claim 1, wherein the storage protocol switching instruction is a trigger instruction for characterizing a switch from an interaction between the server and the storage device by using the SCSI protocol to the interaction between the server and the storage device by using the NVMe protocol.

17. The method for the data interaction under different storage protocols according to claim 1, wherein the upgraded storage device has a host management function, a block data space management function and a protocol parsing function.

18. The method for the data interaction under different storage protocols according to claim 17, wherein the host management function is to recognize the server according to information of an FC port connected to the server and a universally unique identifier (UUID) of the server, select a block data space according to requirements of business, map the block data space to the server, and record a mapping relationship in a host management function module; and
the block data space management function records an address and a size of the block data space.

* * * * *